US012583544B2

(12) United States Patent  
Makimura

(10) Patent No.: US 12,583,544 B2  
(45) Date of Patent: Mar. 24, 2026

(54) MIRROR DEVICE AND STRADDLE-TYPE VEHICLE

(71) Applicant: KAWASAKI MOTORS, LTD., Akashi (JP)

(72) Inventor: Kazuki Makimura, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 602 days.

(21) Appl. No.: 17/961,141

(22) Filed: Oct. 6, 2022

(65) Prior Publication Data

US 2023/0108141 A1 Apr. 6, 2023

(30) Foreign Application Priority Data

Oct. 6, 2021 (JP) ................................. 2021-164860

(51) Int. Cl.  
B62J 29/00 (2006.01)

(52) U.S. Cl.  
CPC ..................................... B62J 29/00 (2013.01)

(58) Field of Classification Search  
CPC ..... B62J 29/00; B62J 6/05; B62J 6/054; B62J 6/055; B62J 6/22  
USPC .................................. 359/842, 872; 362/474  
See application file for complete search history.

(56) References Cited

U.S. PATENT DOCUMENTS

| | | | | |
|---|---|---|---|---|
| 4,394,066 A | * | 7/1983 | Sharp ......................... | B60R 1/06 |
| | | | | 359/872 |
| 4,733,336 A | * | 3/1988 | Skogler ................... | B60R 1/086 |
| | | | | 362/520 |

| | | | | |
|---|---|---|---|---|
| 4,759,620 A | * | 7/1988 | Sakuma .................... | B60R 1/06 |
| | | | | 248/475.1 |
| 4,815,837 A | * | 3/1989 | Kikuchi .................... | B60R 1/07 |
| | | | | 439/459 |
| 4,832,477 A | * | 5/1989 | Torii ....................... | B60R 1/074 |
| | | | | 248/478 |
| 5,313,336 A | * | 5/1994 | Sakao ....................... | B60R 1/06 |
| | | | | 248/478 |
| 5,579,178 A | * | 11/1996 | Mochizuki .............. | B60R 1/074 |
| | | | | 359/872 |
| 5,621,577 A | * | 4/1997 | Lang ..................... | B60R 1/0605 |
| | | | | 359/872 |
| 5,781,353 A | * | 7/1998 | Seubert ..................... | B60R 1/06 |
| | | | | 248/478 |

(Continued)

FOREIGN PATENT DOCUMENTS

| | | |
|---|---|---|
| EP | 2949554 A | 12/2015 |
| JP | UM-S54-036258 A | 8/1979 |

(Continued)

*Primary Examiner* — Ricky D Shafer  
(74) *Attorney, Agent, or Firm* — PROCOPIO, CORY, HARGREAVES & SAVITCH LLP

(57) ABSTRACT

There are provided a mirror device and a straddle-type vehicle including: a stay attached to a vehicle body; a housing supported on the stay; a mirror mechanism including a mirror and a holding portion that holds the mirror, at least a part of the holding portion being accommodated in the housing, and the mirror mechanism being attached to the housing; and an attachment portion in which a receiving portion subjected to an attachment and detachment operation is exposed to an outside of the housing and the mirror mechanism, the attachment portion detachably attaching the mirror mechanism to the housing.

8 Claims, 7 Drawing Sheets

(56)     References Cited

U.S. PATENT DOCUMENTS

| | | | |
|---|---|---|---|
| 7,044,612 B2 * | 5/2006 | Centmayer | B60R 1/0612 |
| | | | 359/881 |
| 2001/0019460 A1 * | 9/2001 | Hirano | B60R 1/07 |
| | | | 359/872 |
| 2002/0191408 A1 * | 12/2002 | Miller | B60Q 1/2665 |
| | | | 362/494 |
| 2007/0035865 A1 * | 2/2007 | Ohashi | B60R 1/072 |
| | | | 359/877 |
| 2008/0062544 A1 * | 3/2008 | Kitajima | B60Q 1/2665 |
| | | | 359/872 |
| 2009/0073704 A1 * | 3/2009 | Kuboshima | B60Q 1/381 |
| | | | 362/473 |
| 2011/0141590 A1 * | 6/2011 | Iseki | B60R 1/074 |
| | | | 29/592.1 |
| 2016/0068107 A1 * | 3/2016 | Sawada | B60Q 1/34 |
| | | | 362/540 |
| 2016/0152294 A1 | 6/2016 | Kwag et al. | |
| 2016/0236742 A1 * | 8/2016 | Chen | B60R 1/1207 |
| 2016/0236743 A1 * | 8/2016 | Kheawhorm | B60Q 1/0047 |
| 2017/0015382 A1 * | 1/2017 | Takakuwa | F02M 35/162 |

FOREIGN PATENT DOCUMENTS

| | | | |
|---|---|---|---|
| JP | UM-H02-034343 A | | 3/1990 |
| JP | 04325386 A | * | 11/1992 |
| JP | H04-325386 A | | 11/1992 |
| JP | 2001301523 A | * | 10/2001 |
| JP | 2015-227105 A | | 12/2015 |
| JP | 2016-101914 A | | 6/2016 |
| JP | 2018-034696 A | | 3/2018 |
| JP | 2019-149364 A | | 9/2019 |
| WO | 2006-038271 A1 | | 4/2006 |

* cited by examiner

FIG. 5

MIRROR DEVICE AND STRADDLE-TYPE VEHICLE

CROSS-REFERENCE TO RELATED APPLICATIONS

This application is based on and claims priority under 35 USC 119 from Japanese Patent Application No. 2021-164860 filed on Oct. 6, 2021, the contents of which are incorporated herein by reference.

TECHNICAL FIELD

The present disclosure relates to a vehicle including a mirror device.

BACKGROUND ART

JP2015-227105A discloses a straddle-type vehicle including a mirror device. In the mirror device described in JP2015-227105A, after a mirror holding portion is swingably held by a mirror fixing portion screwed to a housing, a mirror is fitted to the mirror holding portion.

In the mirror device described in JP2015-227105A, the screw is located in a space between the mirror and the housing, and when the mirror is fitted to the mirror holding portion, the space is a closed space. Therefore, since it is difficult to handle (turn) the screw, it is difficult to disassemble the mirror device.

SUMMARY OF INVENTION

The present disclosure provides a mirror device and a straddle-type vehicle which can facilitate disassembly of the mirror device.

According to an illustrative aspect of the present disclosure, a mirror device includes: a stay attached to a vehicle body; a housing supported on the stay; a mirror mechanism including a mirror and a holding portion that holds the mirror, at least a part of the holding portion being accommodated in the housing, and the mirror mechanism being attached to the housing; and an attachment portion in which a receiving portion subjected to an attachment and detachment operation is exposed to an outside of the housing and the mirror mechanism, the attachment portion detachably attaching the mirror mechanism to the housing.

According to the present disclosure, the mirror device can be easily disassembled.

BRIEF DESCRIPTION OF DRAWINGS

FIG. 5 is a perspective view showing a mirror mechanism.

DESCRIPTION OF EMBODIMENTS

Hereinafter, a mirror device and a straddle-type vehicle according to an embodiment will be described. An example of a vehicle which is an application example of the mirror device is the straddle-type vehicle. Mirror devices 30 can be applied to a vehicle other than the straddle-type vehicle. The straddle-type vehicle is a vehicle driven by a driver who is a user in a state of straddling a seat, and may be, for example, a motorcycle, a motor tricycle, an all terrain vehicle (ATV), and a personal watercraft (PWC). In the following embodiment, an example in which the straddle-type vehicle is a motorcycle will be described. The motorcycle is a two-wheeled vehicle equipped with a power engine for obtaining a driving force.

Figure 1:
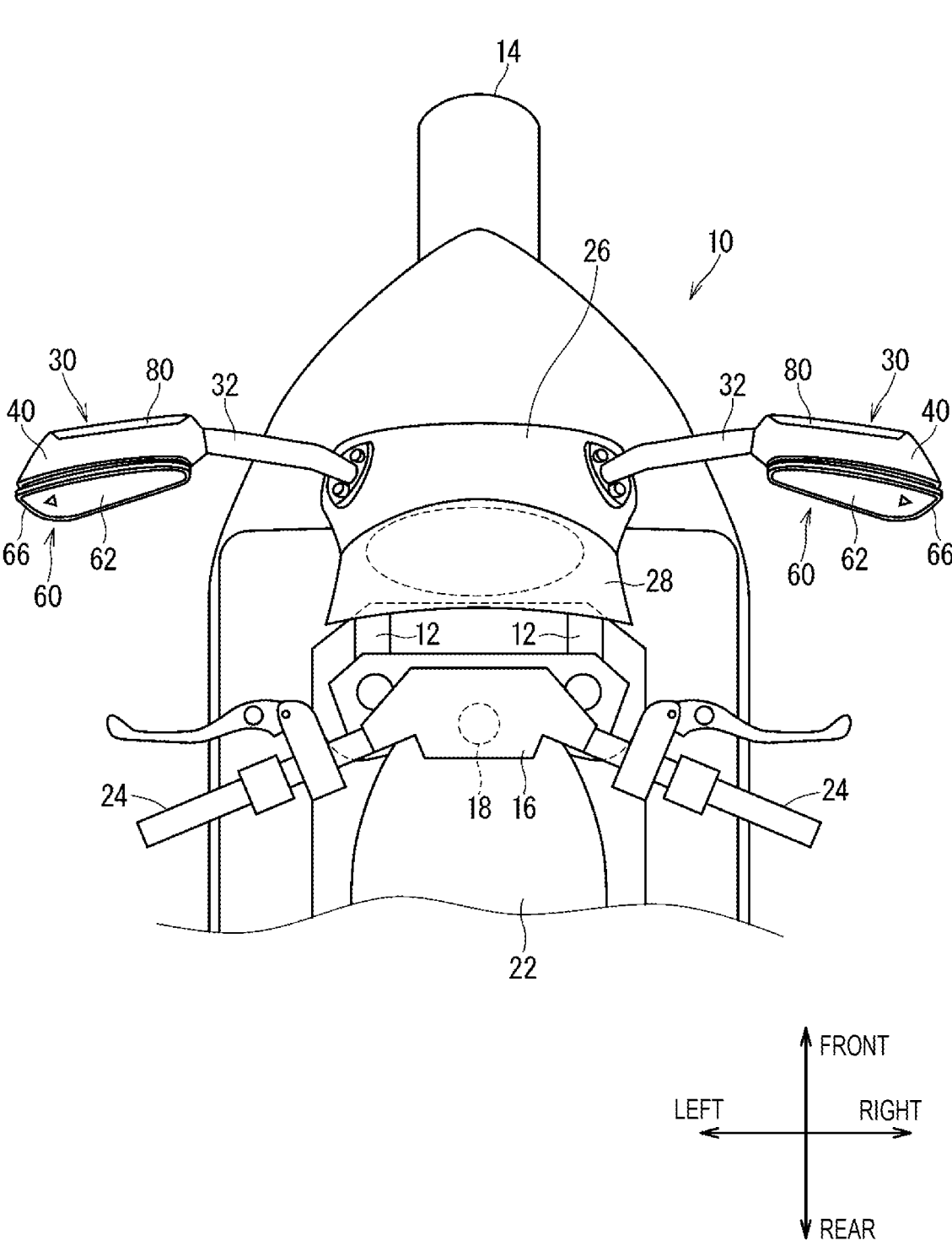
FIG. 1 is a plan view showing a motorcycle to which a mirror device is applied.

FIG. 1 is a plan view showing a motorcycle 10 to which the mirror devices 30 are applied. FIG. 1 shows a front portion of the motorcycle 10. In the following description, when referring to upper and lower, front and rear, and left and right, each direction is defined as follows. First, a side on which a front wheel 14 of the motorcycle 10 contacts a road surface is defined as the upper, and an opposite side thereof is defined as the lower. When the motorcycle 10 travels, a traveling direction is defined as the front, and an opposite side thereof is defined as the rear. Further, in a state in which the user is riding on the motorcycle 10 as the driver, left and right with respect to the user are defined as the left and right of the motorcycle 10. A width direction is a left-right vehicle width direction.

In the motorcycle 10, the front wheel 14 is rotatably provided at lower end portions of front forks 12. When the motorcycle 10 travels, the front wheel 14 rotates at the lower end portions of the front forks 12. A pair of upper and lower brackets 16 (an upper bracket is shown in FIG. 1) are attached to upper end portions of the front forks 12. A steering shaft 18 is supported by the pair of brackets 16. The steering shaft 18 is inserted through a head pipe provided at a front portion of a vehicle body frame and is rotatably supported. Handles 24 are supported by the upper brackets 16. When the handles 24 are operated, the steering shaft 18, the brackets 16, and the front forks 12 rotate around an axis of the head pipe. By this rotation, the front wheel 14 rotates around the axis of the head pipe, and the motorcycle 10 can change the traveling direction. A fuel tank 22, an occupant seat, and the like are provided behind the handles 24, and an engine is provided as the power engine at a position lower than the fuel tank 22 and the occupant seat. The power engine of the motorcycle 10 may be an electric motor. A rear wheel provided at a rear portion of the vehicle body frame is rotationally driven by the power engine.

In the motorcycle 10, positions to which the mirror devices 30 are attached are not particularly limited, and the mirror devices 30 may be attached at positions corresponding to uses of the mirror devices 30. For example, when the mirror devices 30 are objects for the driver to check a rear of the motorcycle 10, the mirror devices 30 may be attached to the handles 24 or a front cowl portion 26. In the present embodiment, an example is shown in which the mirror devices 30 are attached to the front cowl portion 26. The front cowl portion 26 is attached to the vehicle body frame in a manner of covering a front outer side of the handles 24. The front cowl portion 26 is integrally fixed to the vehicle body frame. Therefore, the front cowl portion 26 is fixed to a vehicle body without being displaced regardless of steering of the handles 24.

The motorcycle 10 usually includes the mirror device 30 for a leftward rear check and the mirror device 30 for a rightward rear check. When the mirror devices 30 are attached to the handles 24, the mirror devices 30 may be attached to a left side portion and a right side portion of the handles 24. The handles 24 may be a bar handle or separate handles. The two mirror devices 30 are arranged in the vehicle width direction. A windshield 28 may be located between the two mirror devices 30. The windshield 28 covers a front of the driver who straddles the occupant seat.

Figure 2:
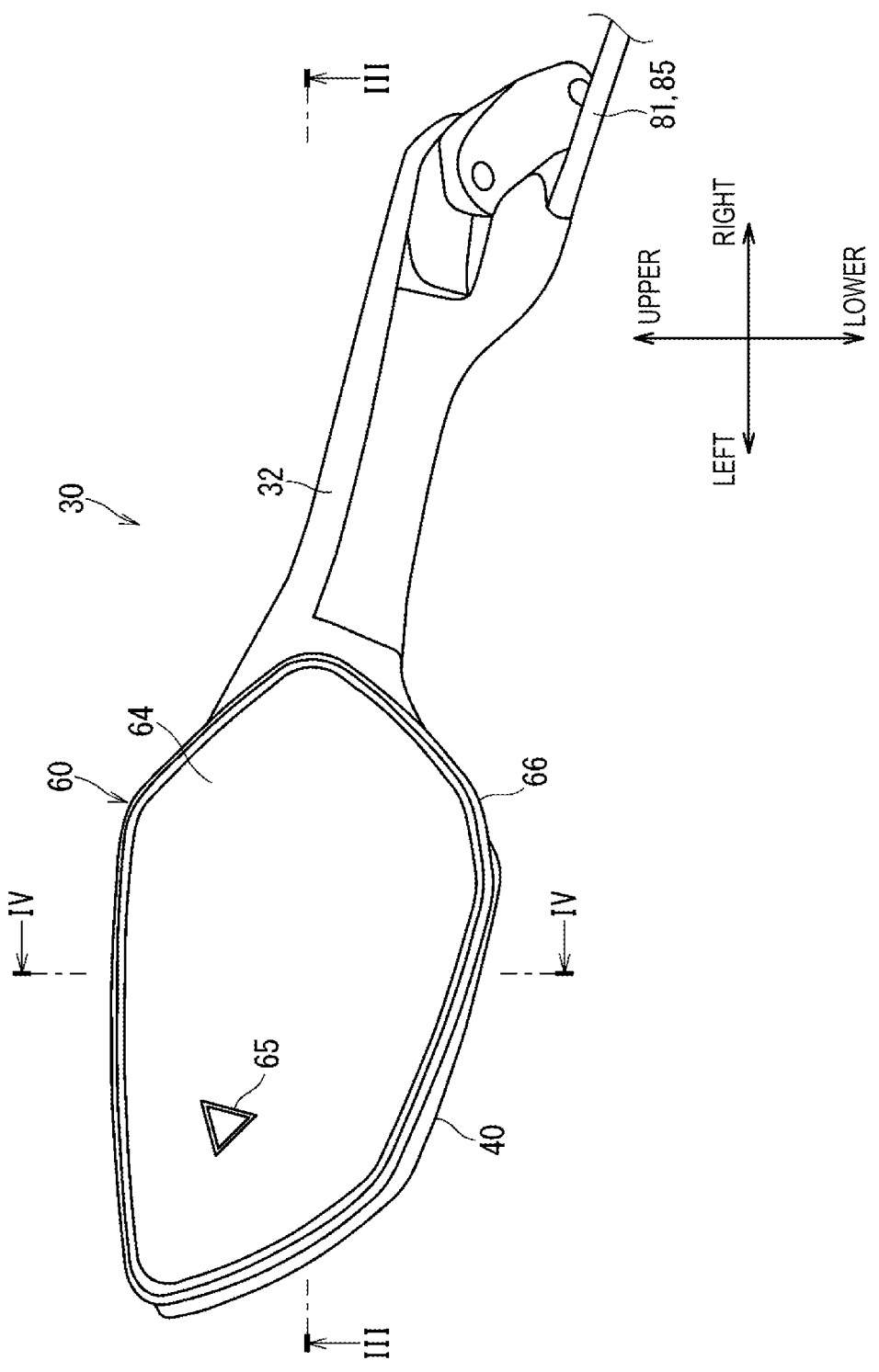
FIG. 2 is a front view showing the mirror device according to an embodiment.
Figure 3:
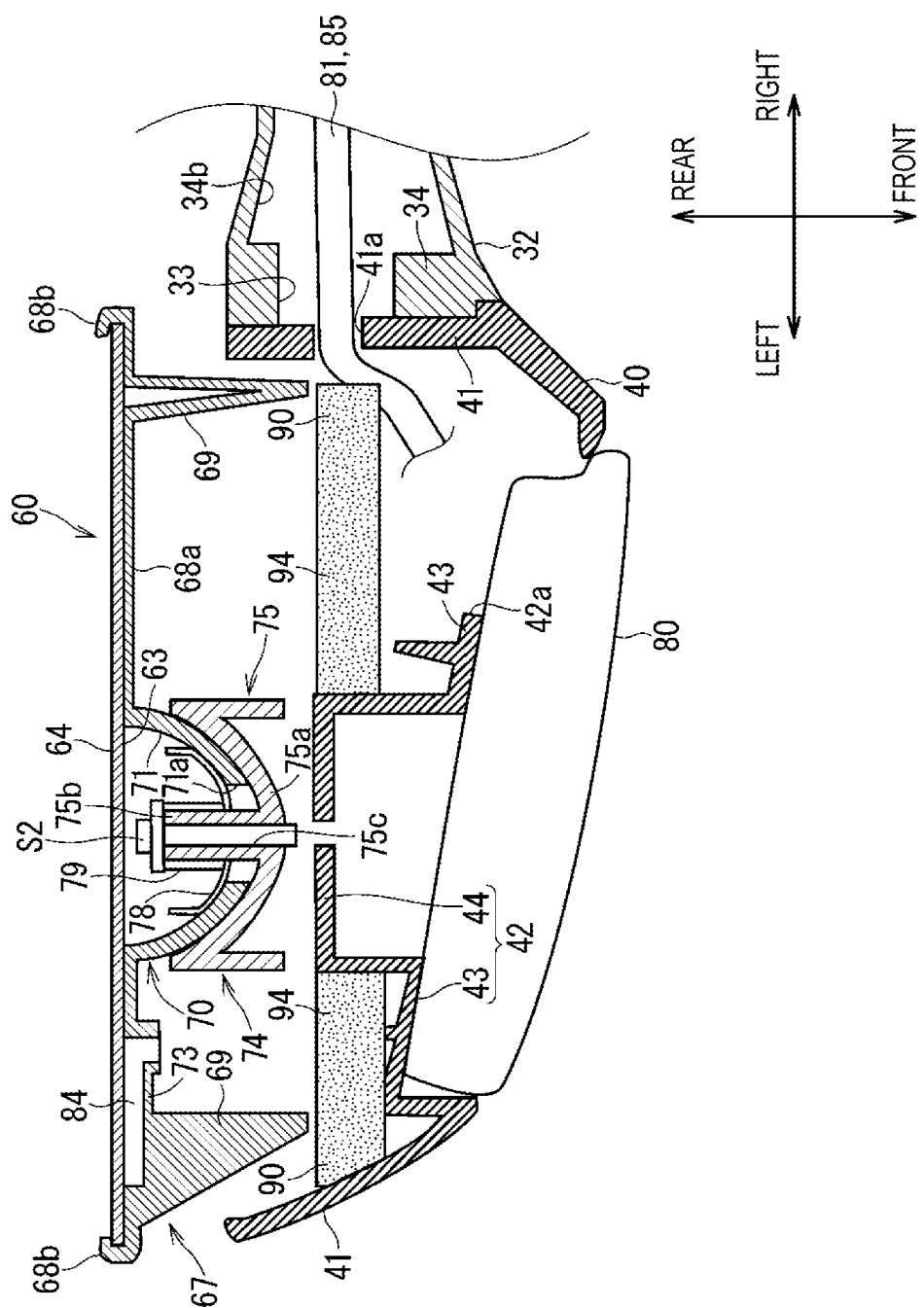
FIG. 3 is a cross-sectional view taken along a line in FIG. 2.
Figure 4:
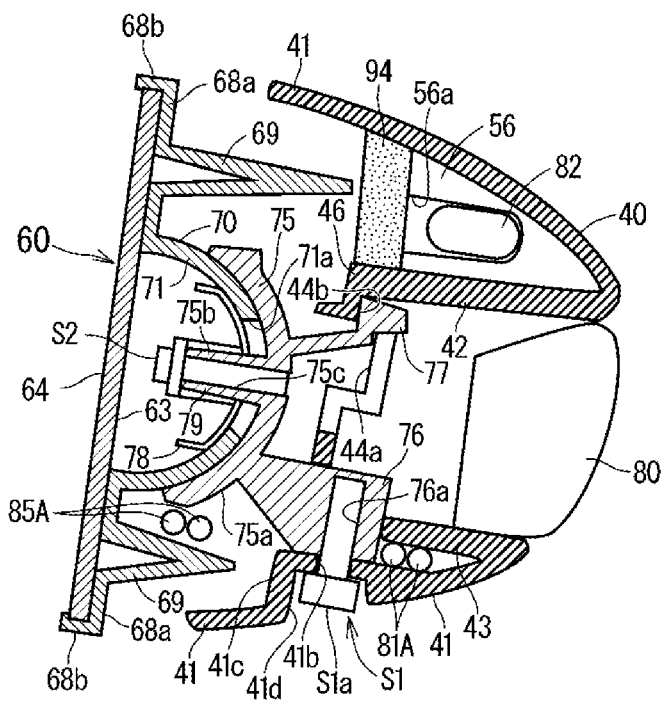
FIG. 4 is a cross-sectional view taken along a line IV-IV in FIG. 2.
Figure 4:
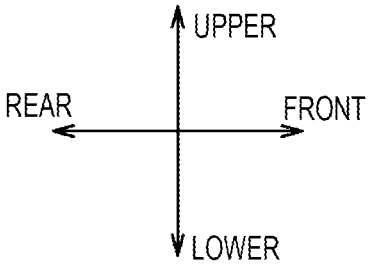
Figure 5:
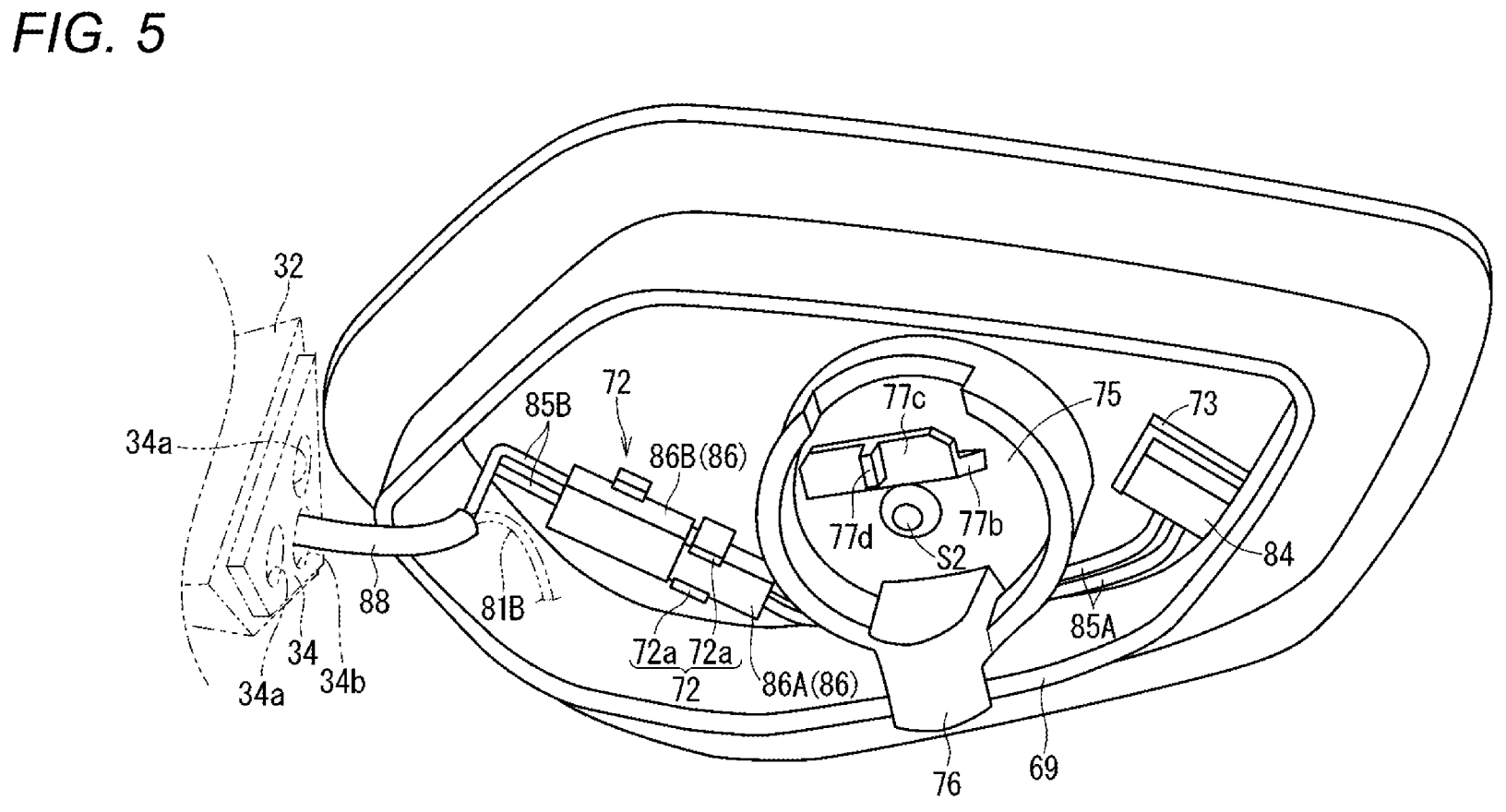
Figure 6:
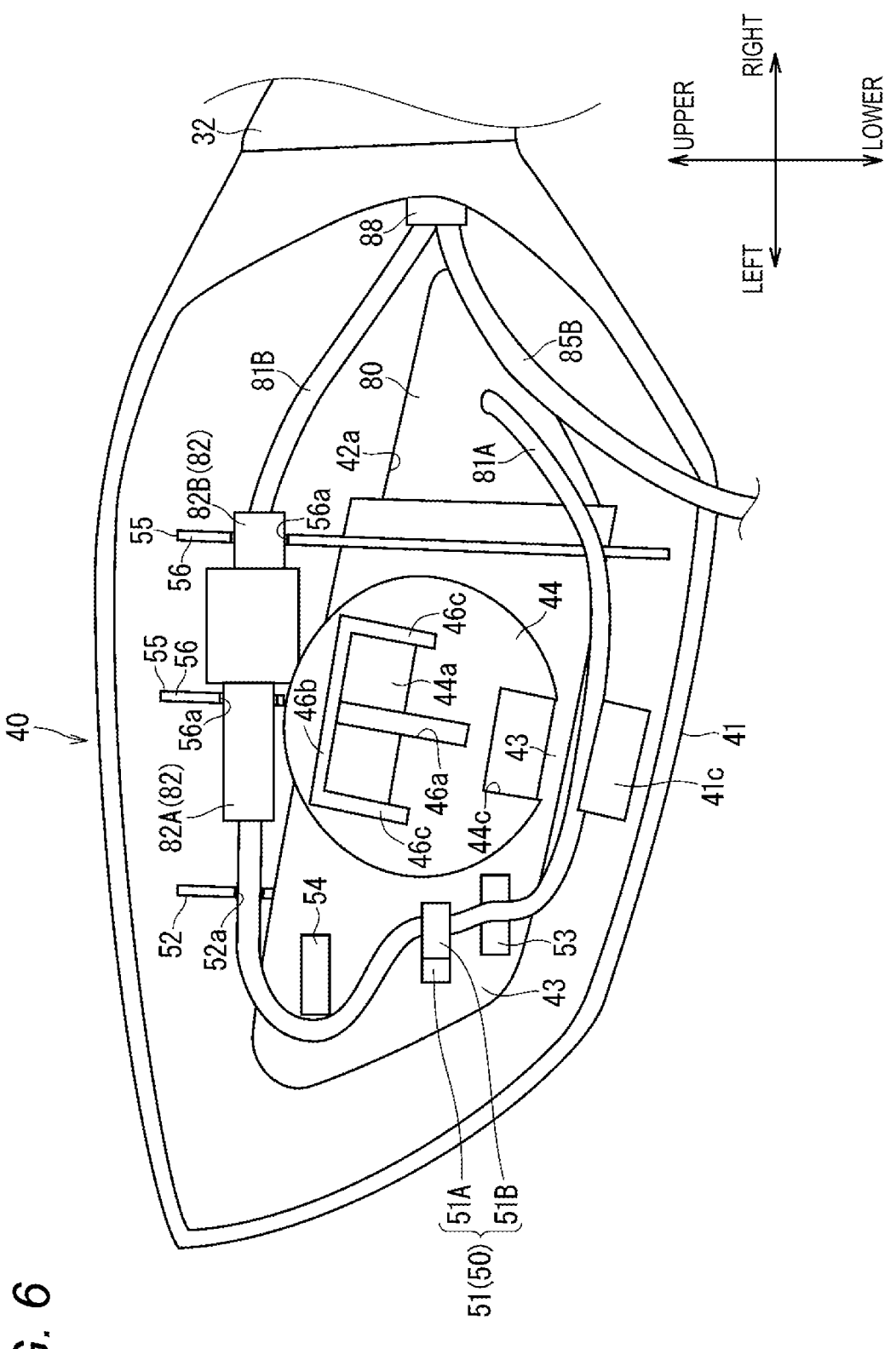
FIG. 6 is a front view showing a housing.
Figure 7:
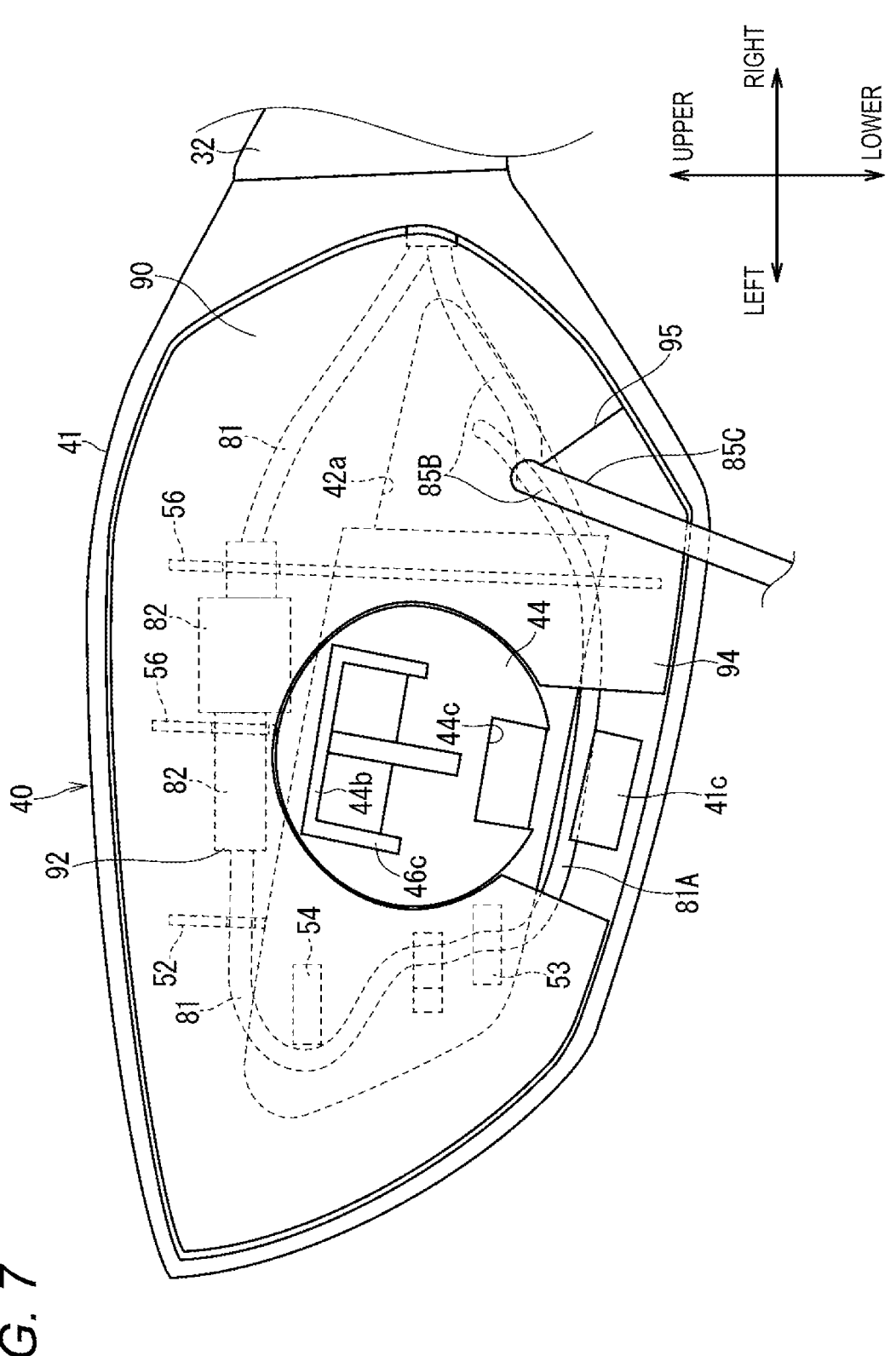
FIG. 7 is a front view showing the housing including an elastic member.

FIG. 2 is a front view showing the mirror device 30 according to the embodiment. FIG. 3 is a cross-sectional view taken along a line in FIG. 2. FIG. 4 is a cross-sectional view taken along a line Iv-Iv in FIG. 2. FIG. 5 is a perspective view showing a mirror mechanism 60. FIG. 6 is a front view showing a housing 40. FIG. 7 is a front view showing the housing 40 including an elastic member 94. In an example shown in FIG. 2, an example of the mirror device 30 for the leftward rear check is shown. Hereinafter, the mirror device 30 for the leftward rear check will be described as an example. A configuration described in the mirror device 30 for the leftward rear check is also applicable to the mirror device 30 for the rightward rear check unless any contradiction occurs. The mirror device 30 for the rightward rear check may have the same configuration as that of the mirror device 30 for the leftward rear check except that a shape of the mirror device 30 for the rightward rear check is bilaterally symmetrical to a shape of the mirror device 30 for the leftward rear check. The mirror device 30 for the leftward rear check and the mirror device 30 for the rightward rear check may have configurations different from each other in addition to the symmetrical shapes. For example, a case is present where some connection components and the like are in one of the mirror device 30 for the leftward rear check and the mirror device 30 for the rightward rear check, and not in the other.

The mirror device 30 includes a stay 32, the housing 40, the mirror mechanism 60, and an attachment portion S1.

The stay 32 is attached to the handle 24 or the front cowl portion 26 of the vehicle body. The stay 32 is formed in an elongated shape. A base end portion of the stay 32 is connected to a mirror device fixing portion formed in the vehicle body. A distal end portion of the stay 32 is connected to the housing 40. By providing the stay 32, the housing 40 can be disposed at a position away from the vehicle body. In the present embodiment, the distal end portion of the stay 32 is disposed outward in the vehicle width direction from a side surface of the vehicle body. The stay 32 is formed in a tubular portion in which a hollow space through which cable-shaped members 81 and 85 to be described later can pass in a longitudinal direction is formed. Accordingly, openings that are open in the longitudinal direction are formed at both end portions of the stay 32 in the longitudinal direction. The housing 40 is supported by the stay 32. The housing 40 is formed in a bowl shape in which an opening that opens to one side is formed.

The mirror mechanism 60 includes a mirror 62 and a holding portion 66 that holds the mirror 62. At least a part of the holding portion 66 is accommodated in the housing 40. The mirror mechanism 60 is attached to the housing 40. The mirror 62 covers the opening formed in the housing 40, thereby closing an accommodation space formed in the housing 40. In a state in which the mirror device 30 is attached to the vehicle body, the opening of the housing 40 is opened toward a rear of the vehicle body, and the mirror 62 covers the accommodation space of the housing 40 from behind the vehicle body. The mirror 62 includes a surface that faces outward and is formed as a mirror surface, and is formed in, for example, a plate shape. The holding portion 66 functions as an intervening member that holds the mirror 62 in the housing 40. The holding portion 66 holds the mirror 62 such that a position of the mirror 62 is adjustable with respect to the housing 40. In the present embodiment, the holding portion 66 has a spherical joint structure and includes a movable portion fixed to the mirror 62 and a fixed portion fixed to the housing 40. Since the movable portion is connected to the fixed portion as a spherical bearing structure, an angle of the mirror 62 can be adjusted with respect to the housing 40. In the present embodiment, the holding portion 66 is provided in a manner of being attachable to and detachable from the housing 40. Specifically, the fixed portion of the holding portion 66 described above is fixed to the housing 40 by the attachment portion S1.

The attachment portion S1 detachably attaches the fixed portion of the holding portion 66 to the housing 40. The attachment portion S1 includes a receiving portion. The receiving portion receives an attachment and detachment operation performed by an operator. The receiving portion is exposed to an outside of the housing 40 and the mirror mechanism 60. In other words, the receiving portion is formed at a portion of the mirror device 30 that is exposed to an outside. In the present embodiment, the attachment portion includes a screw S1. The holding portion 66 is fixed to the housing 40 by the screw S1. A head S1a of the screw S1 is the receiving portion.

In the present embodiment, the mirror device 30 includes cable-shaped members, the connection components, and connectors. The cable-shaped member extends from the space in the housing 40 to the vehicle body through a passage formed in the stay 32. The cable-shaped member is assumed to be a linear member such as a string-like member, a cable-like member, or a hose-like member. Preferably, the cable-shaped member has flexibility. As described above, the cable-shaped member may be a member that is thin and extends in the longitudinal direction, and may be able to pass through the passage in the stay 32. When the mirror device 30 is fixed to the front cowl portion 26 as in the present embodiment, the front cowl portion 26 is fixed to the vehicle body without being displaced regardless of the steering of the handles, and thus a portion of the cable-shaped member disposed in the stay 32 and the housing 40 is not displaced according to the steering of the handles 24.

The connection component is an in-housing object located in the housing 40. The connection component is assumed to be a component different from the mirror mechanism 60 and the attachment portion S1 described above. The connection component is a connection destination of the cable-shaped member. When the connection component is an electrical component, the cable-shaped member may be a power line (power cable) for supplying power to the electrical component or a signal line (signal cable) for exchanging a signal with the electrical component. Alternatively, the cable-shaped member may be composite wiring in which the power line and the signal line are integrated into one. A connection target to be connected to the electrical component via the cable-shaped member is built in the vehicle body. The connection target may be a battery that supplies the power to the electrical component. The connection target may be a control device that gives a control command to the electrical component. The connection target may be an arithmetic device to which a detection result of a sensor is given in a case in which the electrical component is the sensor.

The connector detachably connects the cable-shaped member and the connection component. The connector may be provided in a middle of the cable-shaped member in an accommodation section of the housing 40. That is, in the cable-shaped member, a housing-side cable-shaped member that passes through the housing 40 and extends into the housing 40 may be detachably connected to a connection component-side cable-shaped member that is connected to the connection component. As described above, when the connection component is the electrical component, a connection state of the connector is an electrical connection state in which the power or an electrical signal can be transmitted. When the connector is in a non-connected state, it is possible to take out the connection component from the housing 40 while leaving the housing-side cable-shaped member.

In the present embodiment, the connection component is configured as an indicator provided in the housing 40. Specifically, the connection component is an indicator for a person present around the vehicle, and includes a turn signal 80 that indicates a steering direction. The connection component includes a BSD indicator 84 which is an indicator for the driver and notifies a detection result of a rear blind spot detection (BSD) device. The turn signal 80 is mounted on a bottom of the bowl-shaped housing 40. The turn signal 80 is fixed to the housing 40 side of the housing 40 and the mirror mechanism 60. The BSD indicator 84 is mounted in the opening of the bowl-shaped housing 40. The BSD indicator 84 is fixed to the mirror mechanism 60 side of the housing 40 and the mirror mechanism 60.

The cable-shaped members include the turn signal electric wire 81 and the indicator electric wire 85. The connectors include a turn signal connector 82 and an indicator connector 86. Hereinafter, the turn signal electric wire 81 and the indicator electric wire 85 may be simply referred to as the electric wire 81 and the electric wire 85, respectively. Similarly, the turn signal connector 82 and the indicator connector 86 may be simply referred to as the connector 82 and the connector 86, respectively.

In the present embodiment, since the connector 82 of the connection component fixed to the housing 40 side and the connector 86 of the connection component fixed to the mirror mechanism 60 side are separately provided, it is possible to easily perform a replacement operation when one of the housing 40 side and the mirror mechanism 60 side is damaged.

In the present embodiment, the mirror device 30 includes a cover 90 that covers a gap between the housing 40 and the mirror 62. The cover 90 is located inside the housing 40. The cover 90 covers at least a part of the gap for position adjustment between the housing 40 and the mirror 62.

In the present embodiment, the mirror device 30 includes a built-in component built in the housing 40, and a regulating body 92 that is located in the housing 40 and regulates movement of the built-in component in the housing 40. The cable-shaped member, the connection component, and the connector are examples of the built-in component. The regulating body 92 is provided integrally with the cover 90. In the present exemplary embodiment, the elastic member 94 is provided as a member that serves as the cover 90 and the regulating body 92.

The base end portion of the stay 32 is attached to the vehicle body. The stay 32 may be detachably attached to the vehicle body by, for example, a screw. The stay 32 may be provided in a manner of being angularly displaceable around the base end portion with respect to the vehicle body. Specifically, the housing 40 may be configured to be switchable between a usage state in which the housing 40 is exposed to an outer side in the vehicle width direction and an accommodated state in which the housing 40 is located on an inner side in the vehicle width direction compared to the usage state. In this case, it is preferable that the cable-shaped member has flexibility and is capable of following the angular displacement of the stay 32. The housing 40 is supported by the distal end portion of the stay 32. In the stay 32, an internal passage 33 through which the cable-shaped member passes from the base end portion to the distal end portion thereof is formed. In the present embodiment, the stay 32 is formed in a pipe shape. A hollow portion of the pipe-shaped member may be the internal passage 33. The stay 32 may include a first member having a groove and a second member serving as a lid of the groove in the first member. A portion of the groove including the lid in the first member and the second member may be the internal passage 33.

The housing 40 includes an annular wall portion 41 and a partition wall portion 42. The annular wall portion 41 extends annularly around an axis along an intersecting direction intersecting a longitudinal direction of the stay 32. The intersecting direction is a direction along a front-rear direction of the vehicle in a state in which the mirror device 30 is attached to the vehicle body. A space surrounded and defined by the annular wall portion 41 is the accommodation space in the housing 40. The annular wall portion 41 is formed with a first opening that opens rearward and a second opening that opens forward in a state in which the annular wall portion 41 is attached to the vehicle body. A front portion of the mirror mechanism 60 along the front-rear direction is accommodated in the accommodation space through the first opening. The turn signal 80 is accommodated in the accommodation space through the second opening. The second opening is smaller than the first opening. A dimension of the annular wall portion 41 perpendicular to the intersecting direction gradually increases from the front toward the rear.

The partition wall portion 42 partitions the accommodation space in the front-rear direction. The mirror mechanism 60 is located behind the partition wall portion 42. The turn signal 80 is located in front of the partition wall portion 42. The partition wall portion 42 extends from an edge portion of the second opening of the annular wall portion 41 toward the accommodation space. The turn signal 80 may be configured to be attachable to and detachable from the housing 40. In this case, a fastening member that fixes the turn signal 80 to the housing 40, for example, a bolt may be provided in the housing 40. When the screw S1 is loosened and the mirror 62 is removed from the housing 40, the bolt that fixes the turn signal 80 can also be handled (turned).

The stay 32 and the housing 40 may be separate components from each other as in the present embodiment. In this case, the stay 32 and the housing 40 may be detachably attached by screwing or the like. For example, as shown in FIG. 5, screw holes 34a are formed in an end surface 34 of a second end portion of the stay 32. A screw hole is also formed in a portion of the annular wall portion 41 of the housing 40 which faces the end surface 34 of the second end portion of the stay 32. The stay 32 and the housing 40 are screwed through these screw holes. However, the stay 32 and the housing 40 may be integrally formed.

A through hole 34b is formed in the end surface 34 of the second end portion of the stay 32. A through hole 41a is also formed in the portion of the annular wall portion 41 of the housing 40 which faces the end surface 34 of the second end portion of the stay 32. As shown in FIG. 5, the electric wires 81 and 85 extend from the internal passage 33 of the stay 32 toward the accommodation space through the through hole 34b of the stay 32 and the through hole 41a of the annular wall portion 41.

The through hole 34b of the stay 32 and the through hole 41a of the annular wall portion 41 are located behind the partition wall portion 42. The electric wires 81 and 85 extending from the internal passage 33 of the stay 32 toward the accommodation space pass behind the partition wall portion 42. A through hole 42a is formed in the partition wall portion 42. The electric wire 81 is connected to the turn signal 80 through the through hole 42a. A rear portion of the turn signal 80 is exposed to a rear of the partition wall portion 42 from the through hole 42a.

The mirror 62 includes, for example, a base plate 63 and a mirror surface portion 64. The base plate 63 is a transparent flat plate. The base plate 63 is made of glass, resin, or the like. The mirror surface portion 64 is located on a first surface of the base plate 63. A mirror surface film made of aluminum, silver, or the like is formed as the mirror surface portion 64.

The holding portion 66 includes a first holding member 67 and a second holding member 74. The first holding member 67 and the second holding member 74 are members formed separately from each other. The mirror 62 is fixed to the first holding member 67. The first holding member 67 is held by the second holding member 74 such that a position of the first holding member 67 is adjustable. The second holding member 74 is fixed to the housing 40.

The first holding member 67 includes a holding frame 68 and an annular rib 69. The holding frame 68 includes a support frame portion 68a that supports a surface of the mirror 62 that faces forward, and an annular frame portion 68b that protrudes rearward from an outer edge of the support frame portion 68a. The annular frame portion 68b is fitted to an outer edge portion of the mirror 62 and fixed to the holding frame 68 in a posture in which the mirror 62 mirrors rearward. The mirror 62 and the holding frame 68 cover the first opening from behind the first opening of the annular wall portion 41. The annular rib 69 protrudes forward from the support frame portion 68a. The annular rib 69 is formed smaller than the annular wall portion 41. A distal end portion of the annular rib 69 is accommodated in the accommodation space through the first opening. A gap is formed between the annular rib 69 and the annular wall portion 41. The gap is a gap for adjusting the positions of the first holding member 67 and the second holding member 74.

A structure that enables the position adjustment of the first holding member 67 and the second holding member 74 is not particularly limited, and can be set as appropriate. In the present embodiment, the positions of the first holding member 67 and the second holding member 74 can be adjusted by a movable portion 70 provided in the first holding member 67 and a support portion 75 provided in the second holding member 74.

Specifically, the movable portion 70 is located inside the annular rib 69. The movable portion 70 includes a convex surface 71. The support portion 75 includes a concave surface 75a and a support shaft 75b. The convex surface 71 and the concave surface 75a are formed in a hemispherical shape in which the convex surface 71 and the concave surface 75a can be fitted to each other. A through hole 71a is formed in the convex surface 71. The support shaft 75b protrudes rearward from a center of the concave surface 75a. The support shaft 75b passes through the through hole 71a. The support shaft 75b has a smaller radial dimension than the through hole 71a. A gap is formed in a radial direction between an outer surface of the support shaft 75b and an inner surface of the through hole 71a. The movable portion 70 can move with respect to the support portion 75 due to the presence of the radial gap between the annular rib 69 and the annular wall portion 41 and the radial gap between the outer surface of the support shaft 75b and the inner surface of the through hole 71a. When the movable portion 70 moves along a spherical surface with respect to the support portion 75, a direction of the movable portion 70 with respect to the support portion 75 changes. Accordingly, the position of the first holding member 67 can be adjusted with respect to the second holding member 74.

A position at which the support shaft 75b passes through a center of the through hole 71a is set as a reference position. When the convex surface 71 moves along the concave surface 75a, the movable portion 70 at the reference position can move in all directions with respect to the support portion 75. For example, when at least one of contact between the annular rib 69 and the annular wall portion 41 and contact between the outer surface of the support shaft 75b and the inner surface of the through hole 71a occurs, movement of the movable portion 70 and the support portion 75 is restricted.

The movable portion 70 can move with respect to the support portion 75 when an adjuster performs operation against a spring force, and is pressed so as not to move by the spring force when the adjuster does not perform the operation. For example, a pressing member 78 is provided on a side opposite to the concave surface 75a with respect to the convex surface 71. A spring member 79 such as a coil spring is attached around the support shaft 75b. The support shaft 75b has a screw hole 75c therein. The pressing member 78 and the spring member 79 are sandwiched between a screw S2 attached to the screw hole 75c and the convex surface 71. When the adjuster performs the operation, the movable portion 70 slides with respect to the support portion 75 against a frictional force caused by the pressing member 78 and the spring member 79. In the present embodiment, an axis of a bolt S1 is disposed on a plane including an axis of a bolt S2. In other words, the axis of the bolt S2 and the axis of the bolt S1 are not in a twisted position, and a plane including the axis of the bolt S2 and the axis of the bolt S1 is present.

As shown in FIG. 4, the second holding member 74 is fixed to the housing 40 via the screw S1. As a screwing structure of the housing 40 and the holding portion 66, a through hole 41b penetrating in a thickness direction is formed in the housing 40. The through hole 41b is formed to have a diameter larger than that of a shaft portion of the screw S1 and smaller than that of the head S1a of the screw S1. The holding portion 66 includes a screw receiving portion 76 in which a screw hole that is a female screw is formed. The through hole 41b penetrates the annular wall portion 41. The screw receiving portion 76 is provided on the second holding member 74. The screw receiving portion 76 protrudes forward from the support portion 75. The screw receiving portion 76 is accommodated in the accommodation space. A female screw hole 76a into which the bolt S1 that is a male screw is screwed is formed in the screw receiving portion 76. In a state in which the holding portion 66 is fixed to the housing 40 by the screw S1, an axis of the through hole 41b and an axis of the female screw hole 76a coincide with each other. The screw S1 is inserted into the through hole 41b from an outside of the annular wall portion 41 and screwed to the screw receiving portion 76. The head S1a of the screw S1 is exposed to the outside of the annular wall portion 41. The female screw hole 76a may be formed in a member made of resin or in a member made of metal. For example, a metal nut may be embedded in the screw receiving portion 76 by insert molding.

In the present embodiment, a fitting structure is configured in which the holding portion 66 is fitted to a receiving portion of the housing 40 from a rear. In a state in which the holding portion 66 is fitted to the housing 40, a front end of the holding portion 66 abuts against an inner wall of the housing 40, thereby preventing positional deviation in an insertion direction. In the fitted state, a guide portion that prevents the positional deviation of the holding portion 66 around the insertion direction is formed in the housing 40. In this way, the holding portion 66 is preferably formed in a manner of being fitted to the housing 40. In the state in which the holding portion 66 is fitted to the housing 40, movement is restricted to a state in which the axis of the through hole 41*b* and the axis of the female screw hole 76*a* coincide with each other. Accordingly, the positional deviation between the housing 40 and the holding portion 66 is prevented, and a fastening operation of the bolt S1 can be easily performed.

In the present embodiment, the holding portion 66 is fixed by the bolt S1 in the state in which the holding portion 66 is fitted to the housing 40 and the movement of the holding portion 66 is restricted. Specifically, the holding portion 66 is fitted to the housing 40 such that the holding portion 66 is prevented from rotating around the axis of the bolt S1. Accordingly, the holding portion 66 is prevented from being angularly displaced with respect to the housing 40 when the holding portion 66 is fastened by the bolt S1. Accordingly, the number of bolts S1 that fix the holding portion 66 can be reduced. Since the female screw hole 76*a* and the through hole 41*b* are disposed such that the axes thereof coincide with each other in the fitted state, it is possible to simplify an operation of aligning the holding portion 66 with the housing 40 at the time of attachment, and it is possible to facilitate an attachment and detachment operation.

In the present embodiment, the head S1*a* is located below the housing 40 in the state in which the mirror device 30 is attached to the vehicle body. In other words, in a mounted state of the mirror device 30, the through hole 41*b* is disposed in a manner of opening downward with respect to the housing 40. Therefore, the through hole 41*b* is formed in a lower wall portion of the annular wall portion 41. The screw receiving portion 76 is in contact with the lower wall portion of the annular wall portion 41. In the present embodiment, the annular wall portion 41 is provided with a boss portion 41*c*, and the boss portion 41*c* is formed with the through hole 41*b*. The boss portion 41*c* protrudes toward the accommodation space more than a portion of the annular wall portion 41 around the boss portion 41*c*. A recess 41*d* is formed at a position corresponding to the boss portion 41*c* on an outer surface of the annular wall portion 41. The head S1*a* is accommodated in the recess 41*d*. Accordingly, the head S1*a* is prevented from largely protruding outward beyond the annular wall portion 41. The largest dimension of a depth dimension from a bottom to an opening of the recess 41*d* may be equal to or larger than a height dimension of the head S1*a*. The smallest dimension of the depth dimension from the bottom to the opening of the recess 41*d* may be equal to or larger than the height dimension of the head S1*a*. In the present embodiment, the bolt S1 is formed as a hexagon socket head bolt in which a driving tool is inserted into a hole formed in the head S1*a*, whereby the bolt S1 can be threadably configured even when the head S1*a* is formed in a shape which can be accommodated in the housing 40. By covering a periphery of the head S1*a* with the recess 41*d*, it is possible to prevent the head S1*a* from protruding and to prevent the head S1*a* from coming into direct contact with a colliding object when the vehicle falls down or the like.

In the present embodiment, the holding portion 66 includes a locking portion 77 that is locked to an inside of the housing 40. The housing 40 includes a lock receiving portion 46 that is locked to the locking portion 77. When a locking structure using the locking portion 77 is added to the screwing structure using the screw S1, fixing strength of the housing 40 and the holding portion 66 is increased. The locking portion 77 faces the screw receiving portion 76 along a direction parallel to an axial direction of the female screw hole 76*a*. The lock receiving portion 46 is located on a side opposite to the screw receiving portion 76 with respect to the locking portion 77.

A front portion of the holding portion 66 including the screw receiving portion 76 and the locking portion 77 is inserted into the accommodation space through the first opening. The insertion direction is a direction along the front-rear direction, and here, a direction slightly inclined from the front-rear direction. The locking portion 77 and the lock receiving portion 46 are locked in the insertion direction. An axial direction of the screw S1 is a direction intersecting the insertion direction, and here, a direction orthogonal to the insertion direction.

The locking portion 77 is provided on the second holding member 74. As shown in FIG. 5, the locking portion 77 includes an elastic hook piece 77*a*. The elastic hook piece 77*a* includes an extension piece 77*b* and a locking piece 77*c*. The extension piece 77*b* protrudes forward from the support portion 75. The locking piece 77*c* protrudes from a distal end of the extension piece 77*b* in a direction intersecting an extending direction of the extension piece 77*b*. Here, the locking piece 77*c* protrudes upward from the distal end of the extension piece 77*b*.

The lock receiving portion 46 is provided on the partition wall portion 42. The partition wall portion 42 includes a first partition wall portion 43 and a second partition wall portion 44 behind the first partition wall portion 43. The second partition wall portion 44 is provided with the lock receiving portion 46. The second partition wall portion 44 is formed with a recess 44*a* in which the locking piece 77*c* is accommodated, and a through hole 44*b* is formed above the recess 44*a*. A distal end of the locking piece 77*c* is fitted into the through hole 44*b*, and is locked to an edge portion of the through hole 44*b* on a rear side. The edge portion of the through hole 44*b* on the rear side serves as the lock receiving portion 46.

The locking portion 77 is provided with a rib 77*d* that increases rigidity of the locking piece 77*c*. The rib 77*d* is provided on a front surface of the locking piece 77*c*. A through hole 46*a* through which the rib 77*d* passes is formed in the lock receiving portion 46. The lock receiving portion 46 is also provided with ribs 46*b* and 46*c* for increasing rigidity. The ribs 46*b* and 46*c* include a first rib 46*b* and second ribs 46*c*. The first rib 46*b* and the second ribs 46*c* are provided on a surface of the partition wall portion 42 that faces rearward. The first rib 46*b* is provided behind a portion to which the locking piece 77*c* is locked. The second ribs 46*c* extend downward from both ends of the first rib 46*b*. The recess 44*a* is formed between the first rib 46*b* and the two second ribs 46*c*. The rib 77*d* of the locking portion 77 and the through hole 46*a* and the ribs 46*b* and 46*c* of the lock receiving portion 46 restrict a position of the locking piece 77*c*. The rib 77*d* of the locking portion 77 and the through hole 46*a* and the ribs 46*b* and 46*c* of the lock receiving portion 46 function as a guide when the locking portion 77 is locked to the lock receiving portion 46.

A recess 44*c* through which the screw receiving portion 76 passes is formed below the second partition wall portion 44. The screw receiving portion 76 is fitted into the recess 44*c*. As shown in FIG. 4, the first partition wall portion 43 extending from the edge portion of the second opening of the annular wall portion 41 is located in front of the screw receiving portion 76 fitted into the recess 44c. The first partition wall portion 43 presses a front of the screw receiving portion 76.

In the present embodiment, an example is described in which the cable-shaped members are the electric wires 81 and 85, and the connection components are electrical components such as the turn signal 80 and the indicator 84. The cable-shaped member may be a linear body other than the electric wires 81 and 85. For example, the cable-shaped member may be a wire for transmitting power, a hollow tube for flowing a fluid, an optical fiber for transmitting one other than electricity, or the like. The connection component may be a component corresponding to the cable-shaped member. For example, the connection component may be a mechanical component that is driven by pushing or pulling a wire. For example, the connection component may be a mechanical component in which a fluid supplied from a hollow tube is used as a working fluid. For example, the connection component may be a communication device that performs optical communication via an optical fiber.

In the present embodiment, as shown in FIG. 6, the electric wire 81 includes an electric wire 81A extending from the turn signal 80 and an electric wire 81B extending from the stay 32 side. The connector 82 includes a connector 82A at an end portion of the electric wire 81A and a connector 82B at an end portion of the electric wire 81B. The connectors 82A and 82B are connected to each other. The connectors 82A and 82B are located between the annular wall portion 41 and the partition wall portion 42. The connectors 82A and 82B are located above the second partition wall portion 44. The electric wire 81A extends rearward of the partition wall portion 42 from the through hole 42a. The electric wire 81A extends along a periphery of the second partition wall portion 44. The through hole 42a is provided at a position closer to the stay 32 than the second partition wall portion 44. In an example shown in FIG. 6, the through hole 42a is provided to a right side of the second partition wall portion 44. The electric wire 81A is directed from the through hole 42a to an upper side of the second partition wall portion 44 through a lower side of the second partition wall portion 44 and a left side of the second partition wall portion 44. The electric wire 81A passes below the second partition wall portion 44 and in front of the screw receiving portion 76. A portion of the electric wire 81A that passes below the second partition wall portion 44 is accommodated between the annular wall portion 41 and a portion of the first partition wall portion 43 that presses the front of the screw receiving portion 76. The electric wire 81B extends from the stay 32 to the right side of the second partition wall portion 44 and is directly directed above the second partition wall portion 44. In the housing 40, the electric wire 81A is longer than the electric wire 81B. Therefore, the connectors 82A and 82B can be easily connected.

In the present embodiment, as shown in FIG. 5, the electric wire 85 includes electric wires 85A extending from the indicator 84 and electric wires 85B extending from the stay 32 side. The connector 86 includes a connector 86A at end portions of the electric wires 85A and a connector 86B at end portions of the electric wires 85B. The connectors 86A and 86B are connected to each other. The connectors 86A and 86B are located on a right side of the support portion 75. The electric wire 85A extends from the stay 32 toward the holding frame 68 through the accommodation space of the housing 40. The electric wire 85A passes below the support portion 75. A portion of the electric wire 85A located below the support portion 75 is accommodated between a portion of the annular rib 69 located below the support portion 75 and the support portion 75.

For example, two electric wires 81 and two electric wires 85 are provided. In some of the drawings such as FIG. 6, only one electric wire passing through the same path is shown. The electric wires 81 and 85 are, for example, covered electric wires. The electric wires 81 and 85 may be covered with a covering member 88 in the internal passage 33 of the stay 32 or the like. An end portion of the covering member 88 may be located inside the housing 40. The covering member 88 may be, for example, a tube such as a heat-shrinkable tube. For example, the covering member 88 may be a sheath or the like in which a resin material is extruded around the electric wires 81 and the electric wires 85.

Each of the connectors 82 and 86 includes, for example, a terminal and a connector housing. The terminal includes a wire connecting portion to be connected to an end portion of an electric wire, and a mating-side connecting portion to be connected to a mating-side terminal. The terminal and the electric wire can be connected by crimping, welding, or the like. The connector housing holds the terminal in a state in which the terminal can be connected to the mating-side terminal. Each of the connectors 82 and 86 is a waterproof connector. Each of the connectors 82 and 86 may be a non-waterproof connector.

The electric wire 81A extending from the turn signal 80 may not be provided. In this case, the connector 82B at the end portion of the electric wire 81B may be connected to a connector of a housing of the turn signal 80. Similarly, the electric wire 85A extending from the indicator 84 may not be provided. In this case, the connector 86B at the end portion of the electric wire 85B may be connected to a connector of a housing of the indicator 84.

At least one of the housing 40 and the mirror mechanism 60 includes a cable-shaped member support portion 50 that supports the cable-shaped member. Accordingly, the cable-shaped member is less likely to rattle during vibration of the vehicle, and generation of a contact sound between the cable-shaped member and a peripheral member can be prevented. For example, one of the housing 40 and the mirror mechanism 60 to which the connection component connected to the stay 32 with a long cable-shaped member is attached may include the cable-shaped member support portion 50. However, the cable-shaped member support portion 50 may not be provided.

In the present embodiment, the cable-shaped member support portion 50 is provided in the housing 40. The cable-shaped member support portion 50 supports the electric wire 81A. The cable-shaped member support portion 50 includes a locking claw 51 and a cable-shaped member support rib 52. The locking claw 51 includes a protruding piece 51A protruding rearward from the first partition wall portion 43, and a pressing piece 51B extending from a distal end of the protruding piece 51A in a direction intersecting an extending direction of the protruding piece 51A. The pressing piece 51B presses a rear of the electric wire 81A from a side opposite to the first partition wall portion 43. The cable-shaped member support rib 52 is provided on the annular wall portion 41. The cable-shaped member support rib 52 holds a portion of the electric wire 81A extending from the connector 82A. A groove 52a is formed in the cable-shaped member support rib 52. The electric wire 81A is fitted into the groove 52a. The groove 52a may be formed to be smaller than the electric wire 81A. The electric wire 81A may be press-fitted into the groove 52a.

The housing 40 is provided with projections 53 and 54 that restrict a path of the electric wire 81A. The locking claw 51 is located between the projections 53 and 54 along the path of the electric wire 81A. The protrusion 53 is disposed along the path of the electric wire 81A in a manner of facing the pressing piece 51B. The protrusion 53 protrudes rearward from the first partition wall portion 43. The electric wire 81A passes behind a rear of the protrusion 53 and in front of the pressing piece 51B, whereby the electric wire 81A is bent between the protrusion 53 and the locking claw 51. The protrusion 54 protrudes rearward from the first partition wall portion 43. A left end of the protrusion 54 is located on a left side of the pressing piece 51B. The electric wire 81A passes on a left side of the protrusion 54, whereby the electric wire 81A is bent between the projection 54 and the pressing piece 51B. Accordingly, the electric wire 81A is easily kept in a state of being pressed by the pressing piece 51B.

At least one of the housing 40 and the mirror mechanism 60 includes a connector support portion that supports at least one of the two connectors that are fitted to each other. Accordingly, the connectors are less likely to rattle during the vibration of the vehicle, and occurrence of contact sound between the connectors and a peripheral member can be prevented. It is possible to prevent the two connectors from being erroneously disconnected from each other. In the mirror device 30, when the cable-shaped member extending from the connection component is provided, it is preferable that the connector support portion is also provided. However, the connector support portion may not be provided.

In the present embodiment, each of the housing 40 and the mirror mechanism 60 include the connector support portions. Each of connector support portions 55 of the housing 40 has a shape in which a groove 56a is formed in a support rib 56. The connector 82 is fitted into the groove 56a. The groove 56a may be formed to be smaller than the connector 82. The connector 82 may be press-fitted into the groove 56a. The housing 40 is provided with the connector support portion 55 that supports the connector 82A and the connector support portion 55 that supports the connector 82B. The two support ribs 56 are arranged in a fitting direction of the connectors 82A and 82B and extend in a direction orthogonal to the fitting direction. The cable-shaped member support rib 52 is located on a side opposite to the support rib 56 of the connector 82B with respect to the support rib 56 of the connector 82A, and extends parallel to the support rib 56. A position of the groove 52a into which the electric wire 81A is fitted is a position away from a position of the groove 56a into which the connector 82A is fitted along the fitting direction of the connectors 82A and 82B.

Connector support portions 72 of the mirror mechanism 60 is provided on the first holding member 67. Each of the connector support portions 72 includes a pair of support pieces 72a protruding forward from the holding frame 68. The connector 86 is fitted between the pair of support pieces 72a. The first holding member 67 is provided with the connector support portion 72 that supports the connector 86A and the connector support portion 72 that supports the connector 86B. The two connector support portions 72 are arranged in a fitting direction of the connectors 86A and 86B.

The mirror 62 includes a light transmitting portion 65. The light transmitting portion 65 is a portion through which light is transmitted. The mirror surface portion 64 is not provided in a partial region of the first surface of the base plate 63. The portion of the base plate 63 where the mirror surface portion 64 is not provided serves as the light transmitting portion 65. The connection component using the light transmitting portion 65 is located in a portion of a second surface of the base plate 63 corresponding to the light transmitting portion 65.

The connection component using the light transmitting portion 65 is, for example, a light emitter. The light emitter is used as, for example, the indicator 84 of the BSD. The BSD includes a sensor in addition to the indicator 84. The sensor is, for example, a millimeter wave radar. The sensor detects an object such as a rear vehicle located in a range that is likely to be a blind spot of the driver. The sensor is usually attached to a location other than the mirror device 30, such as a location behind the occupant seat in the motorcycle. The indicator 84 notifies the driver of the presence of the object such as a rear vehicle when the sensor detects the object such as a rear vehicle. When the indicator 84 is the light emitter 84, the light emitted from the light emitter 84 passes through the light transmitting portion 65 and is visually recognized by the driver. The connection component using the light transmitting portion 65 is not required to be the light emitter 84, and may be a camera, a sensor, or the like.

The indicator 84 may be attached to the mirror 62. The holding frame 68 may be provided with an accommodation portion 73 in which the indicator 84 is accommodated. The accommodation portion 73 exposes a part of the indicator 84 to a front side. The electric wire 85A of the indicator 84 extends forward of the holding frame 68 from the accommodation portion 73.

However, the mirror 62 may not include the light transmitting portion 65. In this case, for example, the light emitter 84 may be attached to an outside of the accommodation space. For example, as the indicator 84 of the BSD, a sound generator or the like may be provided instead of the light emitter.

The elastic member 94 is a member that is easily elastically deformed in a thickness direction. Accordingly, the elastic member 94 can be deformed and held according to shapes of the mirror mechanism 60 and the housing 40. For example, the elastic member 94 is bonded to the housing 40 with an adhesive layer provided on a surface thereof facing forward. A portion of the housing 40 to which the elastic member 94 is bonded is provided with uneven portions such as the rib 52 and the ribs 56 as described above. The elastic member 94 is pressed by an end surface of a protrusion in the uneven portion, and can be deformed such that the end surface of the protrusion is embedded in the elastic member 94. Accordingly, an adhesion area between the housing 40 and the adhesive layer of the elastic member 94 is enlarged, and fixing strength between the housing 40 and the elastic member 94 is increased.

As shown in FIG. 7, the elastic member 94 entirely covers the housing 40 except for the second partition wall portion 44 and a lower portion of the second partition wall portion 44. As shown in FIG. 3, the elastic member 94 is located between the first opening and the second opening along the front-rear direction. The elastic member 94 is provided in a manner of surrounding the second partition wall portion 44.

For example, an outer edge portion of the elastic member 94 functions as the cover 90 that covers at least a part of the gap for the position adjustment between the housing 40 and the mirror 62. Specifically, the outer edge portion of the elastic member 94 is disposed inside the annular wall portion 41 in a manner of extending along an upper portion and both side portions of the annular wall portion 41. The outer edge portion of the elastic member 94 faces an inner surface of the annular wall portion 41. The outer edge portion of the elastic member 94 may be in contact with the inner surface of the annular wall portion 41. Accordingly, a gap between the housing 40 and the first holding member 67 is covered with the outer edge portion of the elastic member 94. When the accommodation space is viewed from the gap between the housing 40 and the first holding member 67, a member disposed in front of the elastic member 94 is hidden by the outer edge portion of the elastic member 94.

The annular rib 69 is also located inside the annular wall portion 41. The annular rib 69 is a portion that moves when the positions of the first holding member 67 and the second holding member 74 are adjusted. The portion of the elastic member 94 that functions as the cover 90 may interfere with the annular rib 69 when the positions of the first holding member 67 and the second holding member 74 are adjusted. Even in this case, since the elastic member 94 is elastically deformable, a portion that interferes with the annular rib 69 is elastically deformed, and movement of the annular rib 69 is less likely to be hindered. Accordingly, even when the cover 90 is provided, the position adjustment between the first holding member 67 and the second holding member 74 is less likely to be hindered.

The mirror device 30 includes the turn signal 80 as the light emitter attached to the housing 40. The portion of the elastic member 94 that functions as the cover 90 is interposed in the middle of a path through which light generated by the turn signal 80 leaks to an outside of the mirror mechanism 60 and the housing 40 from the gap for the position adjustment between the housing 40 and the mirror 62. Specifically, as described above, the housing 40 has the through hole 42a for extending the electric wire 81A of the turn signal 80 rearward. The light emitted by the turn signal 80 travels toward the gap between the housing 40 and the first holding member 67 through the through hole 42a. The cover 90 is interposed between the through hole 42a and the gap between the housing 40 and the first holding member 67. Accordingly, the light emitted from the through hole 42a is prevented from leaking to the outside of the mirror mechanism 60 and the housing 40 from the gap between the housing 40 and the first holding member 67. The light from the turn signal 80 toward the driver of the motorcycle 10 is blocked by the cover 90.

The elastic member 94 is separate from the mirror mechanism 60 and the housing 40. The elastic member 94 is made of, for example, a foam resin. The foam resin may be an open-cell foam resin or a closed-cell foam resin. When the elastic member 94 functions as the cover 90, the elastic member 94 preferably has light shielding property. From this viewpoint, the foam resin is preferably the closed-cell foam resin rather than the open-cell foam resin. The elastic member 94 may be elastic or flexible, and is preferably deformable. The elastic member 94 may be formed of a non-woven fabric material or a fiber material such as a sponge material as well as the resin material.

A portion of the elastic member 94 that covers, for example, the electric wire 81 and the connector 82 functions as the regulating body 92. Most of a portion of the electric wire 81 inside the housing 40 except for a portion passing below the second partition wall portion 44 is covered with the elastic member 94. The connector 82 is also covered with the elastic member 94. Accordingly, movement of the electric wire 81 and the connector 82 is restricted by the elastic member 94. A part of the electric wire 81 and the connector 82 may be bonded to the adhesive layer of the elastic member 94. Accordingly, the movement of the electric wire 81 and the connector 82 is more easily restricted by the elastic member 94.

The elastic member 94 also regulates the electric wire 85B. The electric wire 85B includes a cable-shaped bent portion 85C extending from the mirror 62 toward the stay 32. The cable-shaped bent portion 85C is, for example, a portion of the cable-shaped member that is stretched between the mirror 62 and the housing 40. The regulating body 92 restricts movement of the cable-shaped bent portion 85C, whereby the cable-shaped bent portion 85C is prevented from hanging. The cable-shaped bent portion 85C penetrates, for example, the elastic member 94. A slit 95 extending from an outer edge toward an inner region may be formed in the elastic member 94. The cable-shaped bent portion 85C may be passed to the inner region of the elastic member 94 through the slit 95. A through hole may be formed in the elastic member 94, and the cable-shaped bent portion 85C may be passed to the through hole.

Since the portion of the electric wire 85B passing through the elastic member 94 is located in a region inside the outer edge of the elastic member 94, a portion of the electric wire 85B extending rearward from the elastic member 94 is less likely to be exposed from the gap between the housing 40 and the mirror mechanism 60. As shown in FIG. 5, since distal end portions of the electric wire 85B and the electric wire 85A are located inside the annular rib 69, the distal end portions of the electric wire 85B and the electric wire 85A are less likely to be exposed from the gap between the housing 40 and the mirror mechanism 60. Further, since the electric wire 85A passes below the support portion 75, the electric wire 85A is less likely to be visually recognized from above the mirror device 30.

The cable-shaped bent portion 85C can also be moved by adjusting the position of the mirror 62. For example, due to the position adjustment of the mirror 62, a difference in a path length occurs in the cable-shaped bent portion 85C. Specifically, when the first holding member 67 rotates about an axis along a vertical direction from a reference state shown in FIG. 3, a path of the electric wire 85 from the through hole 41a of the housing 40 to the indicator 84 changes. For example, when the first holding member 67 rotates from the reference state shown in FIG. 3 such that a right portion of the first holding member 67 is directed rearward and a left portion of the first holding member 67 is directed forward, the path of the electric wire 85 from the through hole 41a of the housing 40 to the indicator 84 is shortened. For example, when the first holding member 67 rotates from the reference state shown in FIG. 3 such that the right portion of the first holding member 67 is directed forward and the left portion of the first holding member 67 is directed rearward, the path of the electric wire 85 from the through hole 41a of the housing 40 to the indicator 84 is lengthened. When the path length of the electric wire 85 is small, an excess-length portion, which is a difference from when the path length is large, is generated in the cable-shaped bent portion 85C, and the excess-length portion is easily bent. Even in this case, the regulating body 92 restricts the movement of the cable-shaped bent portion 85C, thereby restricting bending of the excess-length portion.

The elastic member 94 is detachably attached to the housing 40. For example, since the adhesive layer is an adhesive layer that can be repeatedly adhered to the housing 40, the elastic member 94 is detachably attached to the housing 40. In addition, the elastic member 94 may be pressed toward the housing 40 by a member different from the housing 40 and the elastic member 94.

According to the mirror device 30 configured as described above, in a state in which the mirror mechanism 60 is attached to the housing 40, the operator can handle (turn) the head S1a of the screw S1 to remove the mirror mechanism 60 from the housing 40. Accordingly, the mirror device 30 is easily disassembled. Specifically, when a portion inside the housing 40 is damaged, the mirror 62 and the housing 40 can be separated from each other by loosening the bolt S1. By separating the mirror 62 and the housing 40 from each other in this manner, the accommodation space of the housing 40 can be exposed, and the operator can easily access the inside of the housing 40.

Here, if it is difficult to disassemble the mirror device 30, even when a part of components of the mirror device 30 is broken, it may be difficult to replace only a portion related to the broken part. On the other hand, in the present disclosure, since the mirror device 30 is easily disassembled, when a part of components of the mirror device 30 is broken, only a portion related to the broken part is easily replaced. When the mirror device 30 is easily disassembled, an additional component can be easily added to the inside of the housing 40 in the mirror device 30.

In the mirror device 30, the housing 40 and the mirror mechanism 60 are supported by the stay 32 at a position of the vehicle body protruding outward in the vehicle width direction. Therefore, there is a possibility that the housing 40 and the mirror mechanism 60 collide with an obstacle, a road surface, or the like at the time of a collision of the straddle-type vehicle with the obstacle, at the time of a road surface collision in the case of a fall, or the like, and the part of the components such as the mirror 62 and the built-in component in the mirror device 30 may be damaged. In the present embodiment, even if the part of the components such as the mirror 62 and the built-in component are damaged, only the damaged part of the components such as the mirror 62 and the built-in component are easily replaced in a state in which the housing 40 is left.

For example, when the mirror 62 is damaged, by replacing the holding portion 66 with a new one together with the mirror 62, a mirror surface can be made new without replacing a remaining portion. When the turn signal 80 is damaged, the accommodation space of the housing 40 can be exposed to replace the turn signal 80. When the stay 32 and the housing 40 are detachable from each other, the housing 40 and the mirror mechanism 60 may also be replaced while leaving the stay 32. In this case, a fixing portion such as a screw that detachably fixes the stay 32 and the housing 40 may be provided in the accommodation space in the housing 40, and the operator may be able to handle (turn) the fixing portion by removing the mirror mechanism 60 from the housing 40.

The through hole 41b of the housing 40 formed for insertion of the bolt S1 is located in a lower surface portion of the housing 40 in a mounted state of the mirror device 30. Accordingly, rainwater can be prevented from entering the housing 40 through the through hole 41b. The head S1a is less likely to be visually recognized, and a decrease in a design of the mirror device 30 is prevented. In the present embodiment, since the head S1a is disposed in the recess 41d so as to be hidden by the housing 40 in a front view of the vehicle body, an increase or disturbance in air resistance can be prevented. Since the head S1a is disposed in the recess 41d of the housing 40 to prevent the head S1a from protruding from the housing 40, the head S1a can be easily prevented from coming into contact with the obstacle at the time of the fall or the like.

Since the holding portion 66 includes the locking portion 77 locked to the inside of the housing 40 and the attachment portion includes the screw S1, the mirror mechanism 60 is attached to the housing 40 by a combination of the locking portion 77 and the screw S1. Since the attachment portion includes the screw S1, the attachment portion can be easily removed. By forming the locking portion 77, it is easy to reduce the number of the screws S1 and to facilitate an attaching and detaching operation as compared with a case in which the locking portion 77 is not provided. By reducing the number of the screws S1, it is possible to easily prevent the increase in the air resistance and to easily prevent water from entering the housing 40.

The turn signal 80 and the electric wire 81 are detachably connected to each other via the connector 82. The indicator 84 and the electric wire 85 are detachably connected to each other via the connector 86. Accordingly, the mirror mechanism 60 is detached from the housing 40, and the connectors 82 and 86 are disconnected, whereby the turn signal 80, the indicator 84, and the electric wires 81 and 85 can also be disassembled. In other words, the connection components can be easily replaced in a state in which the electric wires 81B and 85B passing through the stay 32 are left. Accordingly, the replacement operation can be facilitated as compared with a case in which the connection components are replaced together with the electric wires in the stay 32.

The cover 90 covers at least a part of the gap for the position adjustment between the housing 40 and the mirror 62. Accordingly, a foreign matter can be prevented from entering the housing 40 through the gap. In a case in which the built-in component is present in the housing 40, exposure of the built-in component from the gap is prevented by the cover 90, and the deterioration of the design of the mirror device 30 is prevented.

The cover 90 is interposed in the middle of the path through which the light generated by the turn signal 80 leaks to the outside of the mirror mechanism 60 and the housing 40 from the gap for enabling the position adjustment of the housing 40 and the mirror 62. Accordingly, the light of the turn signal 80 can be prevented from leaking to the outside of the mirror mechanism 60 and the housing 40 from the gap formed between the mirror mechanism 60 and the housing 40.

The regulating body 92 restricts movement of the electric wires 81 and 85 and the connector 82 in the housing 40. Accordingly, an occurrence of wear, abnormal noise, or the like when the electric wires 81 and 85 and the connector 82 move can be prevented.

The regulating body 92 regulates the movement of the cable-shaped bent portion 85C. Accordingly, it is possible to prevent the cable-shaped bent portion 85C from moving in an unintended direction and being sandwiched between the mirror 62 and the housing 40 when the positions of the mirror 62 and the housing 40 are adjusted.

The regulating body 92 is separate from the mirror mechanism 60 and the housing 40, and is detachably attached to the housing 40. Accordingly, a disassembly operation of the mirror device 30 is easily performed.

Modification

Although the receiving portion has been described as being located below the housing 40, this is not an essential configuration. For example, the receiving portion may be located in a direction other than the lower direction, such as the right side, the left side, or the upper side of the housing 40.

Although the attachment portion has been described as including the screw S1 as the bolt which is the male screw, this is not an essential configuration. The attachment portion may be formed in a nut portion that is a female screw. A fastening structure other than screw connection may be adopted for the attachment portion. Instead of the fastening structure, a locking structure, for example, a locking portion that can be operated by a lever may be used. The locking portion may be provided integrally with the holding portion 66.

Although the holding portion 66 has been described as including the locking portion 77, this is not an essential configuration. For example, the attachment portion may include a plurality of screws S1, and the housing 40 and the mirror mechanism 60 may be screwed at a plurality of positions.

Although the mirror devices 30 has been described as including the turn signal 80, the indicator 84, the electric wires 81 and 85, and the connectors 82 and 86, this is not an essential configuration. The mirror device 30 may not include some or all of the turn signal 80, the indicator 84, the electric wires 81 and 85, and the connectors 82 and 86. For example, an indicator for a person around the vehicle and an indicator for the driver are included as the connection components, but only one of the two indicators may be used. When the mirror device 30 includes the turn signal 80, the indicator 84, and the electric wires 81 and 85, the connectors 82 and 86 may not be accommodated between the housing 40 and the mirror mechanism 60. For example, the electric wire 81A extending from the turn signal 80 and the electric wires 85A extending from the indicator 84 may extend to the internal passage 33 of the stay 32.

Although the connector 82 for the turn signal 80 and the connector 86 for the indicator 84 have been described as being provided separately, this is not an essential configuration. The connector for the turn signal 80 and the connector for the indicator 84 may be integrated as one connector. When a plurality of connection components are provided, the connector may be provided for each connection component, or may be provided as an integrated connector that provides connection of the plurality of connection components.

Although the plurality of connection components have been described as including the turn signal 80 as the connection component fixed to the housing 40 and the BSD indicator 84 as the connection component fixed to the mirror mechanism 60, this is not an essential configuration. The plurality of connection components may not be separately fixed to the mirror mechanism 60 and the housing 40, or may be collectively fixed to only one of the mirror mechanism 60 and the housing 40.

The connection component may include an electrical component other than the turn signal 80 and the indicator 84. The electrical component may be an actuator for changing an angle of the mirror 62. The electrical component may be a display that displays an image captured by a separately provided imaging device.

Although the mirror device 30 has been described as including the cover 90 and the regulating body 92, this is not an essential configuration. The mirror device 30 may not include one or both of the cover 90 and the regulating body 92. In the case in which the mirror device 30 includes the cover 90 and the regulating body 92, the cover 90 and the regulating body 92 have been described as being integrated with each other, but this is not an essential configuration. The cover 90 and the regulating body 92 may be separately provided or may be formed of materials different from each other.

Although it has been described that the mirror device 30 includes the turn signal 80 attached to the housing 40, and the cover 90 is interposed between the turn signal 80 and the gap formed between the mirror mechanism 60 and the housing 40, this is not an essential configuration. For example, the mirror device 30 may not include the turn signal 80 attached to the housing 40. For example, the cover 90 may not be interposed between the turn signal 80 and the gap formed between the mirror mechanism 60 and the housing 40.

The configurations described in the above embodiment and the modifications can be combined as appropriate as long as they do not contradict each other.

The present specification and the drawings disclose the following aspects.

According to a first aspect of the present disclosure, a mirror device includes: a stay attached to a vehicle body; a housing supported on the stay; a mirror mechanism including a mirror and a holding portion that holds the mirror, at least a part of the holding portion being accommodated in the housing, and the mirror mechanism being attached to the housing; and an attachment portion in which a receiving portion subjected to an attachment and detachment operation is exposed to an outside of the housing and the mirror mechanism, the attachment portion detachably attaching the mirror mechanism to the housing.

According to the first aspect, in the state in which the mirror mechanism is attached to the housing, the operator can handle (turn) the receiving portion of the attachment portion to remove the mirror mechanism from the housing. Accordingly, the mirror device is easily disassembled.

According to a second aspect of the present disclosure, the receiving portion may be located below the housing. In the second aspect, the water can be prevented from entering the housing from the receiving portion. The receiving portion is less likely to be visually recognized, and the decrease in the design of the mirror device is prevented.

According to a third aspect of the present disclosure, the holding portion may include a locking portion locked to an inside of the housing, and the attachment portion may include a screw. In the third aspect, the mirror mechanism is attached to the housing by the combination of the locking portion and the screw. Since the attachment portion includes the screw, the attachment portion can be easily removed.

According to a fourth aspect of the present disclosure, the mirror device may further include: a cable-shaped member extending from a space inside the housing to the vehicle body through a passage inside the stay; a connection component located in the housing and connectable with the cable-shaped member; and a connector detachably connecting the cable-shaped member and the connection component. In the fourth aspect, the mirror mechanism is detached from the housing, and the connector is disconnected, whereby the cable-shaped member and the connection component can also be disassembled.

According to a fifth aspect of the present disclosure, the holding portion may hold the mirror such that a position of the mirror to the housing is adjustable, and the mirror device may further include a cover located in the housing and covering at least a part of a gap for adjusting the position between the housing and the mirror. In the fifth aspect, the cover can cover the gap for enabling the position adjustment of the housing and the mirror, and the foreign matter can be prevented from entering the housing through the gap. In the case in which the built-in component is present in the housing, the exposure of the built-in component from the gap is prevented by the cover, and the deterioration in the design of the mirror device is prevented.

According to a sixth aspect of the present disclosure, the mirror device may further include a light emitter attached to the housing, and the cover may be interposed in a middle of a path through which light generated by the light emitter leaks from the gap to an outside of the mirror mechanism and the housing. In the sixth aspect, the light of the light emitter can be prevented from leaking to the outside of the mirror mechanism and the housing from the gap formed between the mirror mechanism and the housing.

According to a seventh aspect of the present disclosure, the mirror device may further include: a built-in component built in the housing; and a regulating body located in the housing and configured to regulate a movement of the built-in component in the housing. In the seventh aspect, the occurrence of the wear, the abnormal noise, or the like when the built-in component moves can be prevented.

According to an eight aspect of the present disclosure, the holding portion may hold the mirror such that a position of the mirror to the housing is adjustable. The built-in component may include a cable-shaped bent portion extending from the mirror toward the stay. The regulating body may be configured to restrict a movement of the cable-shaped bent portion. In the eight aspect, it is possible to prevent the cable-shaped bent portion from moving in the unintended direction and being sandwiched between the mirror and the housing when the positions of the mirror and the housing are adjusted.

According to a ninth aspect of the present disclosure, the regulating body may be a member installed separately from the mirror mechanism and the housing, and be detachably attached to the housing. In the ninth aspect, the disassembly operation of the mirror device is easily performed.

According to a tenth aspect of the present disclosure, a straddle-type vehicle includes: the mirror device according to the above aspects; and the vehicle body to which the mirror device is attached. In the tenth aspect, the mirror device in the straddle-type vehicle can be easily disassembled.

The above description is illustrative in all aspects, and the present disclosure is not limited thereto. It is to be understood that numerous modifications that are not shown can be conceived without departing from the scope of the present disclosure.

What is claimed is:

1. A mirror device comprising:
a stay attached to a vehicle body;
a housing supported on the stay;
a mirror mechanism including a mirror and a holding portion that holds the mirror, at least a part of the holding portion being accommodated in the housing, and the mirror mechanism being attached to the housing; and
an attachment portion in which a receiving portion subjected to an attachment and detachment operation is exposed to an outside of the housing and the mirror mechanism, the attachment portion detachably attaching the mirror mechanism to the housing, wherein
the attachment portion includes:
    a screw extending in an upper and lower direction; and
    the receiving portion located at one end of the screw,
the receiving portion is located below the housing when viewed from a width direction of the vehicle body,
the holding portion holds the mirror such that a position of the mirror to the housing is adjustable, and
the mirror device further comprises a cover located in the housing and covering at least a part of a gap for adjusting the position between the housing and the mirror.

2. The mirror device according to claim 1, wherein the holding portion includes a locking portion locked to an inside of the housing.

3. The mirror device according to claim 1, further comprising:
a cable-shaped member extending from a space inside the housing to the vehicle body through a passage inside the stay;
a connection component located in the housing and connectable with the cable-shaped member; and
a connector detachably connecting the cable-shaped member and the connection component.

4. The mirror device according to claim 1, further comprising:
a light emitter attached to the housing, wherein
the cover is interposed in a middle of a path through which light generated by the light emitter leaks from the gap to an outside of the mirror mechanism and the housing.

5. The mirror device according to claim 1, further comprising:
a built-in component built in the housing; and
a regulating body located in the housing and configured to regulate a movement of the built-in component in the housing.

6. The mirror device according to claim 5, wherein
the holding portion holds the mirror such that a position of the mirror to the housing is adjustable,
the built-in component includes a cable-shaped bent portion extending from the mirror toward the stay, and
the regulating body is configured to restrict a movement of the cable-shaped bent portion.

7. The mirror device according to claim 5, wherein
the regulating body is a member installed separately from the mirror mechanism and the housing, and is detachably attached to the housing.

8. A straddle-type vehicle comprising:
the mirror device according to claim 1; and
the vehicle body to which the mirror device is attached.

* * * * *